United States Patent
You et al.

(10) Patent No.: US 11,611,076 B2
(45) Date of Patent: Mar. 21, 2023

(54) POSITIVE ELECTRODE ACTIVE MATERIAL PRECURSOR FOR SECONDARY BATTERY, POSITIVE ELECTRODE ACTIVE MATERIAL, AND LITHIUM SECONDARY BATTERY INCLUDING THE SAME

(71) Applicant: LG Chem, Ltd., Seoul (KR)

(72) Inventors: Min Kyu You, Daejeon (KR); Chi Ho Jo, Daejeon (KR); Sung Bin Park, Daejeon (KR); Hyuck Hur, Daejeon (KR); Jin Tae Hwang, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 510 days.

(21) Appl. No.: 16/480,832

(22) PCT Filed: Sep. 19, 2018

(86) PCT No.: PCT/KR2018/011081
§ 371 (c)(1),
(2) Date: Jul. 25, 2019

(87) PCT Pub. No.: WO2019/059654
PCT Pub. Date: Mar. 28, 2019

(65) Prior Publication Data
US 2020/0251731 A1 Aug. 6, 2020

(30) Foreign Application Priority Data

Sep. 19, 2017 (KR) .......................... 10-2017-0120645
Sep. 18, 2018 (KR) .......................... 10-2018-0111642

(51) Int. Cl.
*H01M 4/525* (2010.01)
*C01G 51/04* (2006.01)
(Continued)

(52) U.S. Cl.
CPC ............ *H01M 4/525* (2013.01); *C01G 51/04* (2013.01); *C01G 51/42* (2013.01); *H01M 4/366* (2013.01);
(Continued)

(58) Field of Classification Search
CPC ................................ C01G 51/66; C01G 51/68
See application file for complete search history.

(56) References Cited

U.S. PATENT DOCUMENTS

2005/0214645 A1  9/2005  Horichi et al.
2010/0176352 A1  7/2010  Chen et al.
(Continued)

FOREIGN PATENT DOCUMENTS

CN  1717823 A  1/2006
CN  101687666 A  3/2010
(Continued)

OTHER PUBLICATIONS

CN105047906A—machine translation (Year: 2015).*
(Continued)

*Primary Examiner* — Haroon S. Sheikh
(74) *Attorney, Agent, or Firm* — Lerner, David, Littenberg, Krumholz & Mentlik, LLP

(57) ABSTRACT

The present invention provides a positive electrode active material precursor for a secondary battery which includes primary particles of $Co_3O_4$ or CoOOH, wherein the primary particle contains a doping element in an amount of 3,000 ppm or more, and has an average particle diameter ($D_{50}$) of 15 μm or more, and a positive electrode active material for a secondary battery which includes particles of a lithium cobalt-based oxide, wherein the primary particle contains a doping element in an amount of 2,500 ppm or more, and has an average particle diameter ($D_{50}$) of 15 μm or more.

9 Claims, 1 Drawing Sheet

(51) Int. Cl.
    *C01G 51/00*      (2006.01)
    *H01M 4/36*      (2006.01)
    *H01M 10/0525*      (2010.01)
    *H01M 4/02*      (2006.01)

(52) U.S. Cl.
    CPC ..... *H01M 10/0525* (2013.01); *C01P 2002/54* (2013.01); *C01P 2004/03* (2013.01); *C01P 2004/61* (2013.01); *C01P 2004/84* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 2012/0183858 A1 | 7/2012 | Ellenwood et al. |
| 2013/0071661 A1 | 3/2013 | Chen et al. |
| 2013/0071747 A1 | 3/2013 | Chen et al. |
| 2014/0124701 A1* | 5/2014 | Vanhatalo .............. C01G 51/04 252/182.1 |
| 2014/0212759 A1 | 7/2014 | Blangero et al. |
| 2015/0162598 A1 | 6/2015 | Kim et al. |
| 2016/0036043 A1 | 2/2016 | Dai et al. |
| 2017/0222211 A1 | 8/2017 | Ryu et al. |
| 2018/0019504 A1 | 1/2018 | Kim et al. |
| 2018/0145368 A1 | 5/2018 | Ochiai et al. |
| 2019/0169042 A1 | 6/2019 | Jo et al. |
| 2019/0280296 A1* | 9/2019 | Li ........................ H01M 10/46 |

FOREIGN PATENT DOCUMENTS

| | | | | |
|---|---|---|---|---|
| CN | 103715418 | A | | 4/2014 |
| CN | 105047906 | A * | 11/2015 | .......... H01M 4/1391 |
| CN | 105753071 | A | | 7/2016 |
| EP | 3203556 | A1 | | 8/2017 |
| EP | 3471181 | A1 | | 4/2019 |
| JP | 5601755 | B2 | | 10/2014 |
| JP | 2018088407 | A | | 6/2018 |
| KR | 20100032369 | A | | 3/2010 |
| KR | 20120029441 | A | | 3/2012 |
| KR | 20140018685 | A | | 2/2014 |
| KR | 101392800 | B1 | | 5/2014 |
| KR | 20160039983 | A | | 4/2016 |
| KR | 20170063387 | A | | 6/2017 |
| KR | 20170075654 | A | | 7/2017 |

OTHER PUBLICATIONS

Extended European Search Report including Written Opinion for Application No. EP18857652.4 dated Dec. 16, 2019.
International Search Report for Application No. PCT/KR2018/011081 dated Jan. 4, 2019, pp. 1-2.
Chinese Search Report for Application No. 201880008449.9 dated May 12, 2021, pp. 1-2.

* cited by examiner

POSITIVE ELECTRODE ACTIVE MATERIAL PRECURSOR FOR SECONDARY BATTERY, POSITIVE ELECTRODE ACTIVE MATERIAL, AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2018/011081, filed Sep. 19, 2018, which claims priority to Korean Patent Application No. 10-2017-0120645, filed Sep. 19, 2017, and Korean Patent Application No. 10-2018-0111642, filed Sep. 18, 2018, the disclosures of which are incorporated herein by reference.

TECHNICAL FIELD

The present invention relates to a positive electrode active material precursor for a secondary battery, a positive electrode active material, and a lithium secondary battery including the same.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

The lithium secondary battery denotes a battery in which a positive electrode including a positive electrode active material capable of intercalating/deintercalating lithium ions, a negative electrode including a negative electrode active material capable of intercalating/deintercalating lithium ions, and an electrolyte containing lithium ions, which is included in an electrode assembly having a microporous separator disposed between the positive electrode and the negative electrode, are included.

A lithium transition metal oxide is used as a positive electrode active material of a lithium secondary battery, and a lithium metal, a lithium alloy, crystalline or amorphous carbon, or a carbon composite is used as a negative electrode active material. An electrode collector may be coated with the active material of appropriate thickness and length or the active material itself may be coated in the form of a film, and the resultant product is then wound or stacked with an insulating separator to prepare an electrode assembly. Thereafter, the electrode assembly is put into a can or a container similar thereto, and a secondary battery is then prepared by injecting an electrolyte solution.

As a positive electrode active material of a lithium secondary battery which has currently been actively researched, developed, and used, there is a layer-structured lithium cobalt oxide ($LiCoO_2$). The lithium cobalt oxide ($LiCoO_2$) is advantageous in that it has a high operating voltage and excellent capacity characteristics, but the lithium cobalt oxide has limitations in that it has poor thermal properties due to an unstable crystal structure caused by delithiation and its structure becomes unstable at high voltage.

Recently, a demand for a high capacity lithium secondary battery has been gradually increased, wherein, with respect to the lithium cobalt oxide ($LiCoO_2$) different from a ternary positive electrode active material, since it is possible to increase capacity only by increasing a voltage, there is a need to develop a lithium cobalt oxide ($LiCoO_2$) which may secure structural stability even at a voltage of 4.5 V or more which is higher than a typical voltage of 4.45 V or less.

In order to prepare the lithium cobalt oxide ($LiCoO_2$) stably operating at a high voltage of 4.5 V or more, a technique of doping with an excessive amount of doping element has been attempted, but, in this case, since the excessive amount of the doping element inhibits the growth of the positive electrode active material, there is a limitation in that it is difficult to prepare a large particle-sized positive electrode active material.

DISCLOSURE OF THE INVENTION

Technical Problem

An aspect of the present invention provides a positive electrode active material of large particle-sized lithium cobalt oxide having an average particle diameter ($D_{50}$) of 15 μm or more by solving a problem of particle growth inhibition by a doping element while having structural stability even at high voltage by doping with an excessive amount of the doping element.

Technical Solution

According to an aspect of the present invention, there is provided a positive electrode active material precursor for a secondary battery which includes primary particles of $Co_3O_4$ or CoOOH, wherein the primary particle contains a doping element in an amount of 3,000 ppm or more, and has an average particle diameter ($D_{50}$) of 15 μm or more.

According to another aspect of the present invention, there is provided a positive electrode active material for a secondary battery which includes primary particles of a lithium cobalt-based oxide, wherein the primary particle contains a doping element in an amount of 2,500 ppm or more, and has an average particle diameter ($D_{50}$) of 15 μm or more.

According to another aspect of the present invention, there is provided a method of preparing a positive electrode active material precursor for a secondary battery which includes preparing a precursor-forming solution including a cobalt-containing starting material and a doping element source; and performing a co-precipitation reaction of the precursor-forming solution to form a $Co_3O_4$ or CoOOH precursor which contains a doping element in an amount of 3,000 ppm or more and has an average particle diameter ($D_{50}$) of primary particles of 15 μm or more.

According to another aspect of the present invention, there is provided a method of preparing a positive electrode active material for a secondary battery which includes mixing and sintering the positive electrode active material precursor powder of claim 1 and a lithium source to form a lithium cobalt-based oxide which contains a doping element in an amount of 2,500 ppm or more and has an average particle diameter ($D_{50}$) of primary particles of 15 μm or more.

According to another aspect of the present invention, there is provided a positive electrode and a lithium secondary battery which include the positive electrode active material.

Advantageous Effects

According to the present invention, a positive electrode active material of large particle-sized lithium cobalt oxide having an average particle diameter ($D_{50}$) of 15 μm or more may be provided by solving a problem of particle growth inhibition by a doping element while having structural stability even at high voltage by doping with an excessive amount of the doping element.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
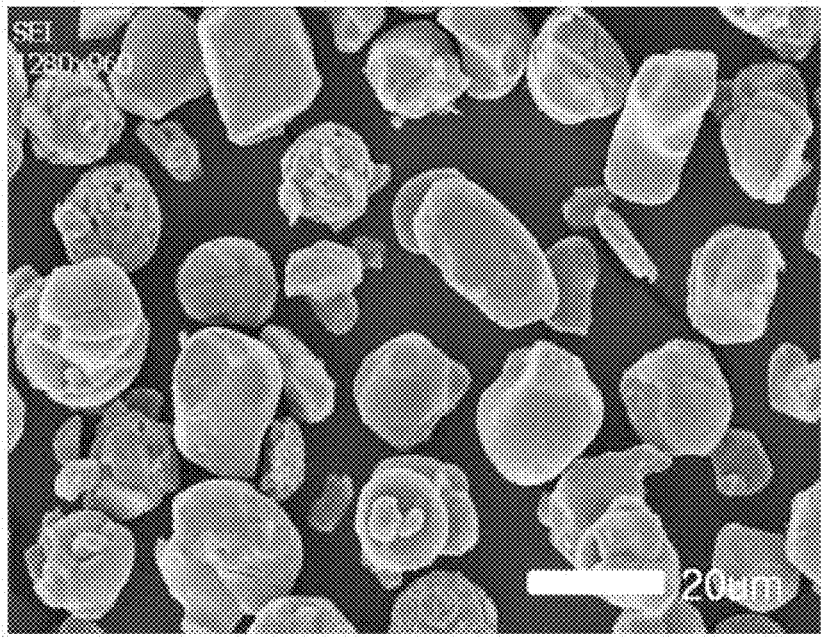
FIG. 1 is an enlarged scanning electron microscope (SEM) image of a positive electrode active material precursor prepared according to Example 1 of the present invention.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention prepares a large particle-sized precursor by doping the precursor with an excessive amount of a doping element and growing a precursor particle size to an average particle diameter ($D_{50}$) of 15 μm or more during the preparation of the positive electrode active material precursor. When a positive electrode active material is prepared by using the large particle-sized precursor excessively doped as described above, a large particle-sized positive electrode active material may be prepared without increases in sintering temperature and amount of lithium added.

Specifically, a positive electrode active material precursor for a secondary battery of the present invention includes primary particles of $Co_3O_4$ or CoOOH, wherein the primary particle contains a doping element in an amount of 3,000 ppm or more and has an average particle diameter ($D_{50}$) of 15 μm or more.

The positive electrode active material precursor of the present invention is composed of the primary particles of $Co_3O_4$ or CoOOH. The positive electrode active material precursor of the present invention is not a secondary particle formed by agglomeration of primary particles, but is preferably primary particles that are not physically separated.

The positive electrode active material precursor of the present invention may have an average particle diameter ($D_{50}$) of the primary particles of 15 μm or more, and may more preferably have an average particle diameter ($D_{50}$) of the primary particles of 17 μm or more. In a case in which the average particle diameter ($D_{50}$) of the primary particles of the positive electrode active material precursor is less than 15 μm, since the doping element inhibits particle growth when the positive electrode active material is prepared by a sintering process using the precursor having an average particle diameter ($D_{50}$) of less than 15 μm, it may be difficult to prepare a positive electrode active material having an average particle diameter ($D_{50}$) of 15 μm or more. If a large particle-sized positive electrode active material having an average particle diameter ($D_{50}$) of 15 μm or more is not prepared, there is a limitation in increasing compression density of a positive electrode, and it is difficult to increase battery capacity.

Also, the primary particle of the positive electrode active material precursor of the present invention may contain a doping element in an amount of 3,000 ppm or more, for example, 4,000 ppm or more. In a case in which the primary particle of the positive electrode active material precursor contains the doping element in an amount of less than 3,000 ppm, it is difficult to secure structural stability of a lithium cobalt-based oxide positive electrode active material, and, particularly, since the structural stability is reduced at a high voltage of 4.5 V or more, battery characteristics, for example, room-temperature and high-temperature life characteristics, may be degraded.

Instead of forming the highly doped precursor as in the present invention, in a case in which an undoped precursor is formed into large particles and high-content doping is performed by additionally adding a doping element when sintered with a lithium source, a high content of the doping element may not be doped with a uniform concentration, and there may be limitations in improving battery characteristics such as battery capacity, rate capability, and life characteristics.

The doping element may be at least one selected from the group consisting of aluminum (Al), titanium (Ti), manganese (Mn), zirconium (Zr), magnesium (Mg), niobium (Nb), calcium (Ca), fluorine (F), and nickel (Ni), and may more preferably be Al. With respect to the Al doping element, since it has a particularly greater particle growth inhibition action than other doping elements (e.g., Mg), it may be more preferable to prepare a positive electrode active material by using a large particle-sized precursor after the large particle-sized precursor is prepared while high-content doping is performed as in the present invention.

With respect to the positive electrode active material precursor doped with the doping element during the preparation of the precursor as described above, the doping element may have a predetermined concentration in the primary particle of the precursor.

Next, a method of preparing the positive electrode active material precursor of the present invention will be described.

The positive electrode active material precursor of the present invention is prepared by including: preparing a precursor-forming solution including a cobalt-containing starting material and a doping element source; and performing a co-precipitation reaction of the precursor-forming solution to form a $Co_3O_4$ or CoOOH precursor which contains a doping element in an amount of 3,000 ppm or more and has an average particle diameter ($D_{50}$) of primary particles of 15 μm or more.

During the preparation of the positive electrode active material precursor in the present invention, the precursor is doped by performing a co-precipitation reaction with a doping element source. Since the precursor may be doped by adding the doping element source in the precursor co-precipitation process, the doping element may be doped with a uniform concentration. Also, since a particle size of the doped precursor may be easily controlled by adjusting co-precipitation reaction time, the size of the precursor may be easily increased while high-content doping is performed.

In the preparation of the precursor, first, a precursor-forming solution including a cobalt-containing starting material and a doping element source is prepared.

As the cobalt-containing starting material, cobalt-containing sulfates, halides, acetic acid salts, sulfides, hydroxides, oxides, or oxyhydroxides may be used, and these materials are not particularly limited as long as they may be dissolved in water. For example, the cobalt-containing starting material may include $Co(SO_4)_2 \cdot 7H_2O$, $CoCl_2$, $Co(OH)_2$, $Co(OCOCH_3)_2 \cdot 4H_2O$, or $Co(NO_3)_2 \cdot 6H_2O$, and any one thereof or a mixture of two or more thereof may be used.

The doping element source may include doping element-containing sulfates, nitrates, acetic acid salts, halides, hydroxides, or oxyhydroxides, and any one thereof or a mixture of two or more thereof may be used. The doping element may be at least one selected from the group consisting of Al, Ti, Mn, Zr, Mg, Nb, Ca, F, and Ni, and more preferably, Al may be included as the doping element.

The precursor-forming solution may be prepared by adding the cobalt-containing starting material and the doping element source to a solvent, specifically, water, or a mixture of water and an organic solvent (specifically, alcohol, etc.) which may be uniformly mixed with the water, or, after a solution including the cobalt-containing starting material and a solution including the doping element source are respectively prepared, the solutions may be mixed and used.

Next, the co-precipitation reaction of the precursor-forming solution is performed to form a $Co_3O_4$ or CoOOH precursor which contains a doping element in an amount of 3,000 ppm or more and has an average particle diameter $(D_{50})$ of primary particles of 15 μm or more.

The $Co_3O_4$ or CoOOH precursor, which contains a doping element in an amount of 3,000 ppm or more and has an average particle diameter $(D_{50})$ of primary particles of 15 μm or more, may be prepared through the co-precipitation reaction by introducing the precursor-forming solution into a reactor and adding a chelating agent and a basic aqueous solution.

The chelating agent may include $NH_4OH$, $(NH_4)_2SO_4$, $NH_4NO_3$, $NH_4Cl$, $CH_3COONH_4$, or $NH_4CO_2$, and any one thereof or a mixture of two or more thereof may be used. Also, the chelating agent may be used in the form of an aqueous solution, and, in this case, water or a mixture of water and an organic solvent (specifically, alcohol, etc.), which may be uniformly mixed with the water, may be used as a solvent.

The basic compound may include a hydroxide of alkali metal or alkaline earth metal, such as NaOH, KOH, or $Ca(OH)_2$, or a hydrate thereof, and any one thereof or a mixture of two or more thereof may be used. The basic compound may also be used in the form of an aqueous solution, and, in this case, water or a mixture of water and an organic solvent (specifically, alcohol, etc.), which may be uniformly mixed with the water, may be used as a solvent. In this case, the basic aqueous solution may have a concentration of 2 M to 10 M.

The co-precipitation reaction for the preparation of the positive electrode active material precursor may be performed under a condition in which a pH is in a range of 10 to 12. In a case in which the pH is outside the above range, there is a concern that the size of the positive electrode active material precursor prepared may be changed or particle breakage may occur. Specifically, the co-precipitation reaction may be performed under a condition in which the pH is in a range of 11 to 12. The above-described pH adjustment may be controlled by the addition of the basic aqueous solution.

The co-precipitation reaction for the preparation of the positive electrode active material precursor may be performed in a temperature range of 30° C. to 80° C. in an inert atmosphere such as nitrogen. A stirring process may be selectively performed to increase a reaction rate during the reaction, and, in this case, a stirring speed may be in a range of 100 rpm to 2,000 rpm.

Primary particles of the $Co_3O_4$ or CoOOH precursor doped with the excessive amount of the doping element are precipitated as a result of the co-precipitation reaction. The amount of the doping element doped in the precursor may be 3,000 ppm or more, for example, 4,000 ppm or more. A large amount of the doping element may be doped by doping the precursor as described above. Also, the precursor thus prepared may be uniformly doped with the doping element without a concentration gradient from a center of the positive electrode active material precursor particle to a surface thereof.

Furthermore, since the particle size of the doped precursor may be easily controlled by adjusting the co-precipitation reaction time during the preparation of the precursor, the size of the precursor may be easily increased while high-content doping is performed. The co-precipitation reaction time may be in a range of 10 hours to 40 hours, for example, 10 hours to 30 hours. A $Co_3O_4$ or CoOOH precursor having an average particle diameter $(D_{50})$ of primary particles of 15 μm or more may be formed by adjusting the co-precipitation reaction time as described above.

The precipitated $Co_3O_4$ or CoOOH precursor may be separated according to a conventional method and may then be selectively subjected to a drying process, and, in this case, the drying process may be performed at 110° C. to 400° C. for 15 hours to 30 hours.

Also, the present invention provides a positive electrode active material prepared by using the large particle-sized precursor excessively doped as described above. Since the positive electrode active material is prepared by using the large particle-sized precursor as the excessively doped primary particles of the present invention, a large particle-sized positive electrode active material, which contains an excessive amount of doping element and has a large average particle diameter of primary particles, may be prepared.

Specifically, the positive electrode active material for a secondary battery of the present invention includes primary particles of a lithium cobalt-based oxide, wherein the primary particle contains a doping element in an amount of 2,500 ppm or more and has an average particle diameter $(D_{50})$ of 15 μm or more.

If a precursor in the form of a secondary particle, in which primary particles are agglomerated, is used, it is difficult to prepare a positive electrode active material having primary particles with a diameter of 15 μm or more due to the particle growth inhibition action of the high content of the doping element during the sintering process. Particularly, with respect to the Al doping element, since it has a particularly greater particle growth inhibition action than other doping elements (e.g., Mg), it may be more preferable to prepare a positive electrode active material by using a large particle-sized precursor after the large particle-sized precursor is prepared while high-content doping is performed as in the present invention.

In the present invention, since the precursor, which contains the doping element in an amount of 3,000 ppm or more and has an average particle diameter ($D_{50}$) of the primary particles of 15 μm or more, is used, a positive electrode active material, which contains a doping element in an amount of 2,500 ppm or more and has an average particle diameter ($D_{50}$) of primary particles of 15 μm or more, may be prepared without increases in sintering temperature and amount of lithium added.

The positive electrode active material of the present invention is composed of primary particles of lithium cobalt-based oxide.

The positive electrode active material of the present invention may have an average particle diameter ($D_{50}$) of the primary particles of 15 μm or more, and may more preferably have an average particle diameter ($D_{50}$) of the primary particles of 17 μm or more. Since the average particle diameter ($D_{50}$) of the primary particles of the positive electrode active material satisfies 15 μm or more, battery capacity, energy density, and life characteristics may be improved. Particularly, since the compression density of the positive electrode may be significantly increased by mixing the large particle-sized positive electrode active material having an average particle diameter ($D_{50}$) of 15 μm or more and a small particle-sized positive electrode active material in a predetermined ratio, the battery capacity may be increased.

Also, the primary particle of the positive electrode active material of the present invention may contain the doping element in an amount of 2,500 ppm or more, for example, 3,000 ppm or more. Since a lithium source is further added when the positive electrode active material is prepared, a content ratio (ppm) of the doping element of the positive electrode active material may be somewhat less than a content ratio (ppm) of the doping element contained in the positive electrode active material precursor. In a case in which the primary particle of the positive electrode active material contains the doping element in an amount of less than 2,500 ppm, it is difficult to secure the structural stability of the lithium cobalt-based oxide positive electrode active material, and, particularly, since the structural stability is reduced at a high voltage of 4.5 V or more, the battery characteristics, for example, room-temperature and high-temperature life characteristics, may be degraded.

The doping element may be at least one selected from the group consisting of Al, Ti, Mn, Zr, Mg, Nb, Ca, F, and Ni, and may more preferably be Al. With respect to the Al doping element, since it has a particularly greater particle growth inhibition action than other doping elements (e.g., Mg), it may be more preferable to prepare a positive electrode active material by using a large particle-sized precursor after the large particle-sized precursor is prepared while high-content doping is performed as in the present invention.

With respect to the positive electrode active material prepared by using the positive electrode active material precursor doped with the doping element during the preparation of the precursor as described above, the doping element may have a predetermined concentration in the primary particle of the positive electrode active material. Also, the primary particle of the positive electrode active material may contain 50% or more of a total amount of the doping element in a center portion corresponding to 50% of a radius from the center of the particle to the surface thereof which is located near the center.

A molar ratio of lithium to metallic elements (Co, M, etc.) excluding lithium (molar ratio of lithium/metallic elements (Co, M, etc.) in the lithium cobalt-based oxide may be in a range of 0.98 to 1.1.

Also, the positive electrode active material according to the embodiment of the present invention further includes a surface layer on the surface of the particle of the lithium cobalt-based oxide, and the surface layer may include an oxide of at least one selected from the group consisting of Mg, Ti, iron (Fe), copper (Cu), Ca, barium (Ba), tin (Sn), antimony (Sb), sodium (Na), zinc (Zn), silicon (Si), yttrium (Y), Zr, Nb, molybdenum (Mo), ruthenium (Ru), rhodium (Rh), palladium (Pd), silver (Ag), cadmium (Cd), scandium (Sc), cerium (Ce), praseodymium (Pr), neodymium (Nd), gadolinium (Gd), dysprosium (Dy), ytterbium (Yb), erbium (Er), cobalt (Co), Al, gallium (Ga), and boron (B).

Next, a method of preparing the positive electrode active material of the present invention will be described.

With respect to the positive electrode active material of the present invention, a lithium cobalt-based oxide, which contains a doping element in an amount of 2,500 ppm or more and has an average particle diameter ($D_{50}$) of primary particles of 15 μm or more, is formed by mixing and sintering the positive electrode active material precursor of the present invention and a lithium source.

As the lithium source, lithium-containing sulfates, nitrates, acetic acid salts, carbonates, oxalates, citrates, halides, hydroxides, or oxyhydroxides may be used, and these materials are not particularly limited as long as they may be dissolved in water. Specifically, the lithium raw material may include $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$, and any one thereof or a mixture of two or more thereof may be used.

Also, an amount of the lithium source used may be determined according to amounts of the lithium and the metallic elements (Co, etc.) excluding lithium in the finally prepared lithium cobalt-based oxide, and, specifically, the lithium source may be used in an amount such that the molar ratio of the lithium to the metallic elements excluding lithium in the finally prepared lithium cobalt-based oxide is in a range of 0.98 to 1.1.

A sintering agent may be further selectively added during the mixing of the precursor and the lithium source. The sintering agent may specifically include an ammonium ion-containing compound such as $NH_4F$, $NH_4NO_3$, or $(NH_4)_2SO_4$; a metal oxide such as $B_2O_3$ or $Bi_2O_3$; or a metal halide such as $NiCl_2$ or $CaCl_2$, and any one thereof or a mixture of two or more thereof may be used. The sintering agent may be used in an amount of 0.01 mol to 0.2 mol based on 1 mol of the precursor. If the amount of the sintering agent is excessively small at less than 0.01 mol, a sintering characteristics improvement effect of the positive electrode active material precursor may be insignificant, and, if the amount of the sintering agent is excessively large at greater than 0.2 mol, there is a concern that performance as the positive electrode active material may degrade and initial capacity of the battery may be reduced during charge and discharge due to the excessive amount of the sintering agent.

Furthermore, a water-removing agent may be further selectively added during the mixing of the precursor and the lithium source. Specifically, the water-removing agent may include citric acid, tartaric acid, glycolic acid, or maleic acid, and any one thereof or a mixture of two or more thereof may be used. The water-removing agent may be used in an amount of 0.01 mol to 0.2 mol based on 1 mol of the precursor.

The sintering may be performed in a temperature range of 900° C. to 1,100° C., for example, 1,000° C. to 1,050° C. If the sintering temperature is less than 900° C., there is a concern that discharge capacity per unit weight may be reduced, cycle characteristics may be degraded, and operating voltage may be reduced due to the residue of unreacted raw materials, and, if the sintering temperature is greater than 1,100° C., there is a concern that the discharge capacity per unit weight may be reduced, the cycle characteristics may be degraded, and the operating voltage may be reduced due to the generation of side reaction products.

The sintering may be performed for 5 hours to 30 hours in an oxidizing atmosphere, such as air or oxygen, or an inert atmosphere including nitrogen or hydrogen.

A surface layer including an inorganic oxide may be further formed on the surface of the particle of the above-prepared lithium cobalt-based oxide.

The surface layer may include an oxide of at least one selected from the group consisting of Mg, Ti, Fe, Cu, Ca, Ba, Sn, Sb, Na, Zn, Si, Y, Zr, Nb, Mo, Ru, Rh, Pd, Ag, Cd, Sc, Ce, Pr, Nd, Gd, Dy, Yb, Er, Co, Al, Ga, and B, and the coating layer may be formed by mixing coating materials, which include elements constituting the surface layer, and performing a heat treatment.

The positive electrode active material of lithium cobalt oxide prepared as described above may be prepared as large particles having an average particle diameter ($D_{50}$) of primary particles of 15 μm or more by solving a problem of particle growth inhibition by the doping element while having structural stability even at high voltage by doping with the excessive amount of the doping element. Thus, the positive electrode active material may be used in a high voltage secondary battery of 4.5 V or more, may achieve high capacity, and may significantly improve life characteristics at the same time.

According to another embodiment of the present invention, provided are a positive electrode for a lithium secondary battery and a lithium secondary battery which include the positive electrode active material.

Specifically, the positive electrode includes a positive electrode collector and a positive electrode active material layer formed on the positive electrode collector and including the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the positive electrode collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of the slurry and manufacturing yield, and may allow to have a viscosity that may provide excellent thickness uniformity during the subsequent coating for the preparation of the positive electrode.

Also, as another method, the positive electrode may be prepared by casting the above-described composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer, for example, may be prepared by coating a composition for forming a negative electrode, which includes the negative electrode active material as well as selectively the binder and the conductive agent, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), fluoroethylene carbonate (FEC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be preferably used, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be more preferably used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLE 1

Preparation of Positive Electrode Active Material Precursor

In a 5 L batch-type reactor set at 60° C., $CoSO_4$ was mixed in water and $Al(OH)_3$ was further mixed in an amount of 0.5 wt % based on the $CoSO_4$ to prepare a precursor-forming solution with a concentration of 2M. A container containing the precursor-forming solution was connected to the reactor, and, additionally, a 25 wt % NaOH aqueous solution and a 15 wt % $NH_4OH$ aqueous solution were prepared and connected to the reactor, respectively. 1 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 10 ml of the 25 wt % NaOH aqueous solution was added, and stirring was then performed at a speed of 1,200 rpm and a temperature of 60° C. to maintain a pH at 12.0. Subsequently, a co-precipitation reaction was performed for 12 hours while respectively adding the precursor-forming solution, the NaOH aqueous solution, and the $NH_4OH$ aqueous solution at rates of 4 ml/min, 1 ml/min, and 1 ml/min to prepare about 15 μm $Co_3O_4$ doped with 5,000 ppm Al. The resulting particles of the $Co_3O_4$ doped with 5,000 ppm Al were separated, washed, and then dried in an oven at 120° C. to prepare a positive electrode active material precursor.

EXAMPLE 2

Preparation of Positive Electrode Active Material Precursor

A positive electrode active material precursor was prepared in the same manner as in Example 1 except that $Al(OH)_3$ was mixed in an amount of 0.3 wt % based on $CoSO_4$ during the doping of the precursor and a co-precipitation reaction was performed for 12 hours to prepare a $Co_3O_4$ precursor (about 15 μm) doped with 3,000 ppm Al.

EXAMPLE 3

Preparation of Positive Electrode Active Material

A positive electrode active material precursor ($Co_3O_4$ doped with 5,000 ppm Al) prepared as in Example 1 and $Li_2CO_3$, as a lithium source, were mixed in a molar ratio of Li/Co of 1.035 and sintered at 1,000° C. for about 17 hours to prepare a lithium cobalt oxide doped with 4,500 ppm Al.

EXAMPLE 4

Preparation of Positive Electrode Active Material

A positive electrode active material precursor ($Co_3O_4$ doped with 3,000 ppm Al) prepared as in Example 2 and $Li_2CO_3$, as a lithium source, were mixed in a molar ratio of Li/Co of 1.035 and sintered at 1,000° C. for about 17 hours to prepare a lithium cobalt oxide doped with 2,500 ppm Al.

COMPARATIVE EXAMPLE 1

Preparation of Positive Electrode Active Material Precursor

A positive electrode active material precursor was prepared in the same manner as in Example 1 except that $Al(OH)_3$ was mixed in an amount of 0.3 wt % based on $CoSO_4$ during the doping of the precursor and a co-precipitation reaction was performed for 6 hours to prepare a $Co_3O_4$ precursor (about 7 μm) doped with 3,000 ppm Al.

COMPARATIVE EXAMPLE 2

Preparation of Positive Electrode Active Material

A positive electrode active material precursor ($Co_3O_4$ doped with 3,000 ppm Al) prepared as in Comparative Example 1 and $Li_2CO_3$, as a lithium source, were mixed in a molar ratio of Li/Co of 1.045 and sintered at 1,020° C. for about 20 hours to prepare a lithium cobalt oxide doped with 2,500 ppm Al.

COMPARATIVE EXAMPLE 3

Preparation of Positive Electrode Active Material

A positive electrode active material was prepared in the same manner as in Example 1 except that an undoped $Co_3O_4$ precursor (about 17 μm) was used and doping was performed by mixing 3,000 ppm of $Al(OH)_3$ with a lithium source during sintering.

The positive electrode active material thus prepared was doped so as to have a concentration gradient in which Al was gradually decreased from the surface of the positive electrode active material to the inside thereof.

COMPARATIVE EXAMPLE 4

Preparation of Positive Electrode Active Material

A precursor, which is in the form of a secondary particle, in which 5 μm primary particles were agglomerated, and doped with 3,000 ppm Al, and $Li_2CO_3$, as a lithium source, were mixed in a molar ratio of Li/Co of 1.045 and sintered at 1,020° C. for about 20 hours to prepare a lithium cobalt oxide doped with 2,500 ppm Al.

Primary particles of the positive electrode active material thus prepared were grown up to 12 μm, but no further growth occurred due to the particle growth inhibition action of the Al.

EXPERIMENTAL EXAMPLE 1

Positive Electrode Active Material Precursor Observation

Figure 2:
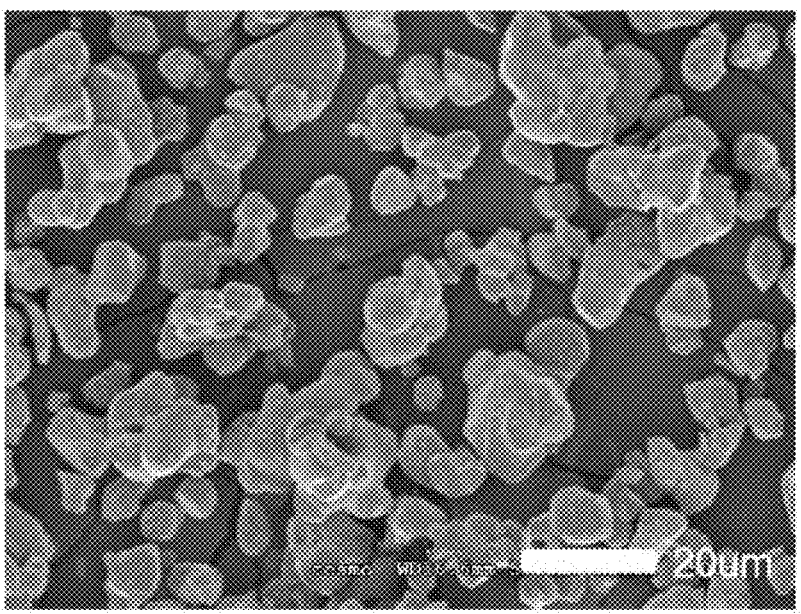
FIG. 2 is an enlarged scanning electron microscope (SEM) image of a positive electrode active material precursor prepared according to Comparative Example 1 of the present invention.

Enlarged scanning electron microscope (SEM) images of the positive electrode active material precursor powders prepared in Example 1 and Comparative Example 1 are illustrated in FIG. 1 (Example 1) and FIG. 2 (Comparative Example 1), respectively.

Referring to FIGS. 1 and 2, the $Co_3O_4$ positive electrode active material precursors prepared in Example 1 and Comparative Example 1 were composed of primary particles, wherein the primary particles of Example 1 (FIG. 1) were large particles having a diameter of about 15 μm, and the primary particles of Comparative Example 1 (FIG. 2) were small particles having a diameter of about 7 μm.

EXPERIMENTAL EXAMPLE 2

Particle Diameter Measurement

Average particle diameters of the primary particles of the positive electrode active material precursors and the positive electrode active materials prepared in Examples 1 to 4 and Comparative Examples 1 and 2 were measured with a particle size distribution (PSD) analyzer, and the results thereof are presented in Table 1 below.

and were large particles having an average particle diameter ($D_{50}$) of the primary particles of 15 μm or more, may be prepared.

In contrast, it may be confirmed that Comparative Example 1 had an average particle diameter ($D_{50}$) of the primary particles of 7 μm. With respect to Comparative Example 2 in which the positive electrode active material was prepared by using the precursor of Comparative Example 1, since particle growth was inhibited by the Al doping element doped in a large amount, the average particle diameter ($D_{50}$) of the primary particles was increased to only 12 μm despite the fact that the sintering temperature and the amount of the lithium added were increased, and thus, a large particle-sized positive electrode active material may not be prepared.

With respect to Comparative Example 4 prepared by using the precursor in the form of a secondary particle in which primary particles are agglomerated, the primary particles were grown up to 12 μm, but no further growth occurred due to the particle growth inhibition action of the Al.

EXPERIMENTAL EXAMPLE 3

Battery Performance Evaluation

Each of the positive electrode active materials prepared in Examples 3 and 4 and Comparative Examples 2 to 4, carbon black, and a PVDF binder were mixed in a N-methylpyrrolidone solvent at a weight ratio of 96:2:2 to prepare a composition for forming a positive electrode, and one surface of an aluminum current collector was coated with the composition, dried at 130° C., and then rolled to prepare a positive electrode.

Lithium metal was used as a negative electrode.

An electrode assembly was prepared by disposing a porous polyethylene separator between the positive electrode and negative electrode thus prepared, and a lithium secondary battery was prepared by disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/dimethyl carbonate/ethylmethyl carbonate (mixing volume ratio of EC/DMC/EMC=3/4/3).

Charge and discharge tests were performed on each of the lithium secondary battery cells (half cells) prepared as

TABLE 1

| | Example 1 | Example 2 | Example 3 | Example 4 | Comparative Example 1 | Comparative Example 2 | Comparative Example 4 |
|---|---|---|---|---|---|---|---|
| Average particle diameter ($D_{50}$) (μm) | 15 | 15 | 17 | 17 | 7 | 12 | 12 |

Referring to Table 1, it may be confirmed that the average particle diameters ($D_{50}$) of the primary particles of the precursors of Examples 1 and 2 were 15 μm or more, and, with respect to Examples 3 and 4 in which the positive electrode active materials were prepared by using the precursors of Examples 1 and 2, respectively, the positive electrode active materials, which were doped with Al in a large amount of 2,500 ppm or more without increasing the sintering temperature and the amount of the lithium added described above to measure capacity and rate capability at 2.0 C/0.1 C, and the results thereof are present in Table 2 below.

Also, each of the lithium secondary battery cells (half cells) prepared as described above was charged at 0.5 C to a voltage of 4.55 V in a constant current/constant voltage (CC/CV) mode at 25° C. and 45° C., cut-off charged at 0.05 C, and discharged at a constant current of 1.0 C to a voltage of 3.0 V to measure capacity retention [%] while 50 cycles of charge and discharge were performed, and the results thereof are present in Table 2.

TABLE 2

|  | Example 3 | Example 4 | Comparative Example 2 | Comparative Example 3 | Comparative Example 4 |
|---|---|---|---|---|---|
| Capacity (mAh/g) | 207 | 209 | 209 | 209 | 208 |
| Rate capability (%) | 92.8 | 92.5 | 91.7 | 91.8 | 91.5 |
| 50 cycle capacity retention at 25° C. (%) | 96 | 95 | 92 | 93 | 92 |
| 50 cycle capacity retention at 45° C. (%) | 95 | 95 | 91 | 91 | 90 |

Referring to Table 2, with respect to Examples 3 and in which the positive electrode active materials were prepared by respectively using the large particle-sized precursors having an average particle diameter ($D_{50}$) of 15 μm or more according to the embodiment of the present invention, rate capabilities were better, cycle characteristics were better, and, particularly, high-temperature cycle characteristics were significantly better than those of Comparative Example 2, in which the positive electrode active material was prepared by using the precursor of Comparative Example 1 having an average particle diameter ($D_{50}$) of the primary particles of 7 μm, and Comparative Example 3 in which the precursor was not doped and the positive electrode active material was prepared by doping the precursor by primary sintering. Also, battery performances of Examples 3 and 4 were better than that of Comparative Example 4.

The invention claimed is:

1. A positive electrode active material precursor for a secondary battery, comprising:
    a primary particle of $Co_3O_4$ or CoOOH,
    wherein the primary particle contains a doping element in an amount of 3,000 ppm or more, and has an average particle diameter ($D_{50}$) of 15 μm or more.

2. The positive electrode active material precursor for a secondary battery of claim 1, wherein the doping element comprises at least one of aluminum (Al), titanium (Ti), manganese (Mn), zirconium (Zr), magnesium (Mg), niobium (Nb), calcium (Ca), fluorine (F), or nickel (Ni).

3. The positive electrode active material precursor for a secondary battery of claim 1, wherein the doping element is Al.

4. The positive electrode active material precursor for a secondary battery of claim 1, wherein the doping element is present in an amount of 4,000 ppm or more.

5. The positive electrode active material precursor for a secondary battery of claim 1, wherein the doping element has a predetermined concentration in the primary particle.

6. A method of preparing a positive electrode active material precursor for a secondary battery of claim 1, comprising:
    preparing a precursor-forming solution including a cobalt-containing starting material and a doping element source; and
    performing a co-precipitation reaction of the precursor-forming solution to form a $Co_3O_4$ or CoOOH precursor which contains a doping element in an amount of 3,000 ppm or more and has an average particle diameter ($D_{50}$) of primary particles of 15 μm or more.

7. The method of claim 6, wherein the doping element comprises at least one of aluminum (Al), titanium (Ti), manganese (Mn), zirconium (Zr), magnesium (Mg), niobium (Nb), calcium (Ca), fluorine (F), and nickel (Ni).

8. The method of claim 6, wherein co-precipitation reaction time is in a range of 10 hours to 40 hours.

9. A method of preparing a positive electrode active material for a secondary battery, comprising mixing and sintering the positive electrode active material precursor of claim 1 and a lithium source to form a lithium cobalt oxide which contains a doping element in an amount of 2,500 ppm or more and has an average particle diameter ($D_{50}$) of primary particles of 15 μm or more.

* * * * *